Patented Aug. 19, 1924.

1,505,648

UNITED STATES PATENT OFFICE.

JAMES GRAHAM LAMB, OF DENVER, COLORADO, ASSIGNOR TO AMERICAN SMELTING AND REFINING COMPANY, OF NEW YORK, N. Y., A CORPORATION OF NEW JERSEY.

PRODUCTION OF CALCIUM ARSENATE FREE FROM WATER-SOLUBLE ARSENIC.

No Drawing.   Application filed February 1, 1921. Serial No. 441,684.

*To all whom it may concern:*

Be it known that I, JAMES GRAHAM LAMB, a citizen of the United States, and resident of Denver, in the county of Denver and State of Colorado, have invented certain new and useful Improvements in the Production of Calcium Arsenate Free from Water-Soluble Arsenic, of which the following is a specification.

The invention relates to an improved process for producing basic calcium arsenate free from water soluble arsenic.

The primary object of the invention is to provide a simple process for treating an arsenic supplying material such as arsenic trioxide ($As_2O_3$) in such a way that there will be produced a basic arsenate, such as calcium arsenate free from soluble arsenic.

The novelty of the process consists primarily in treating a normal arsenate such as trisodium arsenate, with a slight excess of caustic soda in solution with lime to precipitate insoluble basic calcium arsenate free from water soluble arsenic.

Described more in detail, the process consists in oxidizing the white arsenic, by the use of nitric acid and the resulting solution of $As_2O_5$ is treated with caustic soda to form a solution of trisodium arsenate which is a normal salt.

A basic reagent, such as slacked lime in a suspension, is added to the alkaline solution of the trisodium arsenate, in the presence of a slight excess of caustic soda in the solution and calcium arsenate is precipitated therefrom in a finely divided granular form.

The resulting basic calcium arsenate produced by this method is insoluble and entirely free from water soluble arsenic. The mother liquid is evaporated to a concentration of about 50% sodium hydroxide and is used in the caustic soda solution.

Having thus described my invention, I claim:

In the art of producing calcium arsenate entirely free from soluble arsenic the process which consists in forming an alkaline solution of a normal salt of arsenic entirely free from acid arsenates and adding calcium hydroxide in the form of a suspension to transfer all of the arsenic acid of the neutral salt into an insoluble arsenate.

Signed at Denver in the county of Denver and State of Colorado this 18th day of January A. D. 1921.

J. GRAHAM LAMB.